US012493069B2

(12) United States Patent
Liu et al.

(10) Patent No.: US 12,493,069 B2
(45) Date of Patent: Dec. 9, 2025

(54) DETECTING MOTHERBOARD POWER SWITCH DEFECTS AND LCD CABLE SHORTS

(71) Applicant: DELL PRODUCTS L.P., Round Rock, TX (US)

(72) Inventors: Chin-Jui Liu, Taoyuan (TW); Isaac Q. Wang, Austin, TX (US); Ling-Feng Jian, Taipei (TW)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 18/422,071

(22) Filed: Jan. 25, 2024

(65) Prior Publication Data

US 2025/0244379 A1    Jul. 31, 2025

(51) Int. Cl.
*G01R 31/26* (2020.01)
*G01R 31/52* (2020.01)

(52) U.S. Cl.
CPC ......... *G01R 31/2621* (2013.01); *G01R 31/52* (2020.01)

(58) Field of Classification Search
USPC .................................... 324/762.09
See application file for complete search history.

(56) References Cited

U.S. PATENT DOCUMENTS

| RE46,673 E | * | 1/2018 | Lai ..................... H02J 7/00304 |
| 11,630,471 B2 | | 4/2023 | Delshadpour et al. |

* cited by examiner

*Primary Examiner* — Farhana A Hoque
(74) *Attorney, Agent, or Firm* — Larson Newman, LLP

(57) ABSTRACT

A power switch includes an OC detection circuit, a UV detection circuit, and an OC indication circuit. The OC detection circuit detects an over-current in the power switch, provides an OC flag in a first state when no over-current is detected, and provides the OC flag in a second state when the over-current is detected. The UV detection circuit detects an under-voltage in the power switch, and provides a UV fault indication in a third state when the under-voltage is not detected, and provide the UV fault indication in a fourth state when the under-voltage is detected. The OC indication circuit provides an OC fault indication in the third state when the over-current flag is in the first state, and provides the OC fault indication in a fifth state when the over-current flag is in the second state. The UV fault indication and the OC fault indication are configured in a wired-or to provide a common fault indication.

20 Claims, 2 Drawing Sheets

DETECTING MOTHERBOARD POWER SWITCH DEFECTS AND LCD CABLE SHORTS

FIELD OF THE DISCLOSURE

This disclosure generally relates to information handling systems, and more particularly relates to detecting motherboard power switch defects and LCD cable shorts in an information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A power switch may include an over-current detection circuit and an under-voltage detection circuit. The over-current detection circuit detects an over-current in the power switch, provides an over-current flag in a first state when no over-current is detected, and provides the over-current flag in a second state when the over-current is detected. The under-voltage detection circuit detects an under-voltage in the power switch, and provides an under-voltage fault indication in a third state when the under-voltage is not detected, and provides the under-voltage fault indication in a fourth state when the under-voltage is detected. An over-current indication circuit provides an over-current fault indication in the third state when the over-current flag is in the first state, and provides the over-current fault indication in a fifth state when the over-current flag is in the second state. The under-voltage fault indication and the over-current fault indication are configured in a wired-or to provide a common fault indication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
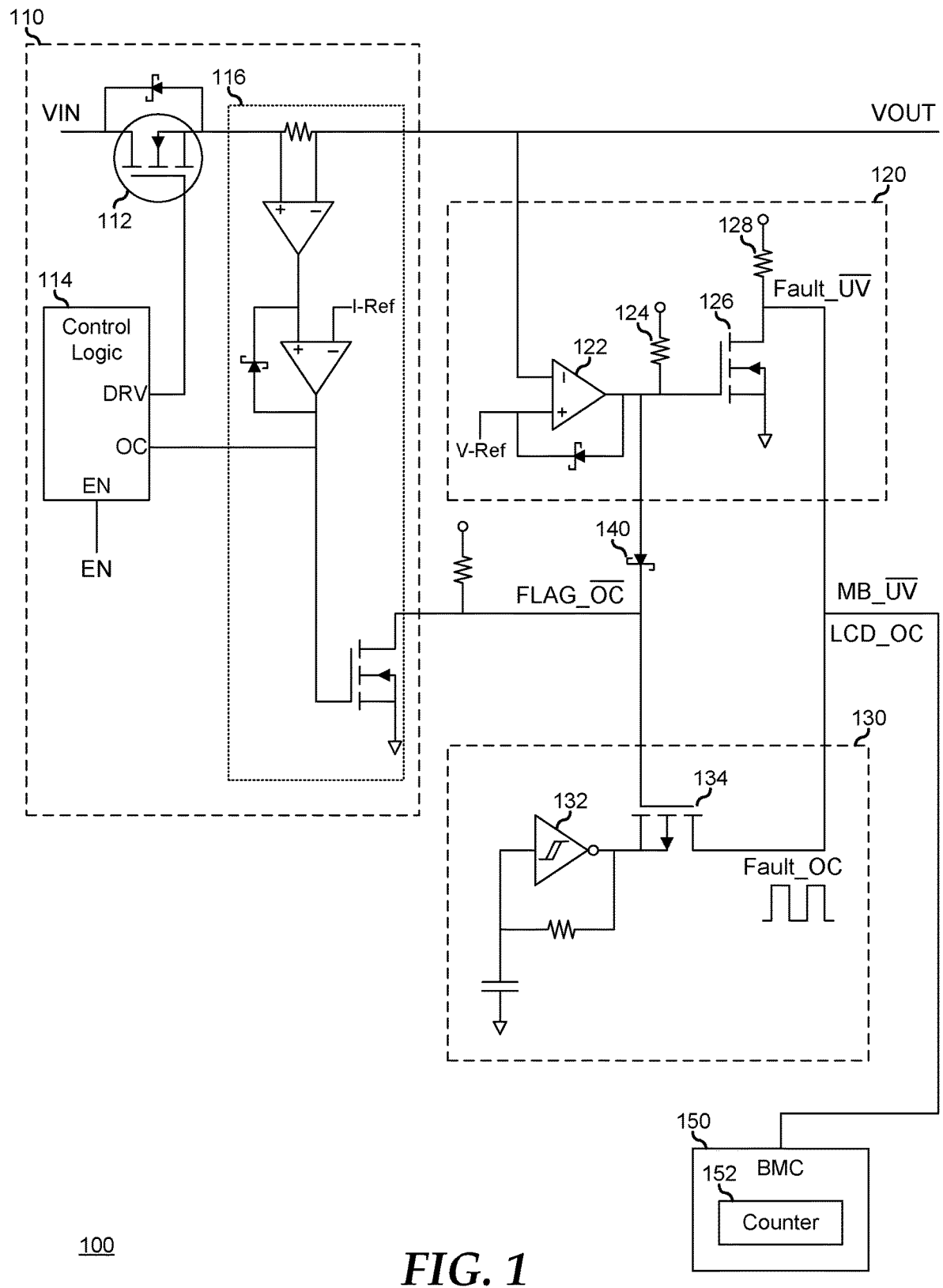
FIG. 1 is a schematic diagram of a power switch and detection circuit for an information handling system according to an embodiment of the current disclosure.

FIG. 1 illustrates a power switch and detection circuit 100 (hereinafter "circuit 100"), including a power switch integrated circuit (IC) 110, an under-voltage detection circuit 120, an over-current indication circuit 130, and a baseboard management controller (BMC) 150. Circuit 100 represents a power switching circuit that is configured to switch a power source (VIN) to a load (VOUT), and to provide various fault condition indications as described further below. Circuit 100 may be understood to be provided in an information handling system. In particular, circuit 100 may be utilized in information handling systems with integrated displays, such as laptop computers or the like. In such cases, various failure modes have typically led to a single "power failure" indication. For example, an under-voltage condition which may be caused by a defective power switch or another failure on a motherboard, may result in a same failure indication as a shorted cable that provides power to the integrated display. Such shorted cables may occur when the cables are routed incorrectly, are not properly designed to length, or have insufficient routing tabs, such that the cables become crimped or pinched, resulting in a short circuit of power to the chassis causing melting or even smoke. However, typical power switch circuits provide a single failure indication, but are incapable of distinguishing between a power switch defect on a motherboard, and a display cable being shorted.

Power switch IC 110 includes a power switch 112, power control logic 114, and an over-current detection circuit 116. Power switch 112 represents a device that controllably switches an input voltage (VIN) to a voltage rail (VOUT) to source power to the downstream load. As illustrated, power switch 112 is implemented as an N-MOS FET, where a logic high "1" signal on the gate terminal turns the power switch on, and where a logic low "0" signal on the gate terminal turns the power switch off. The gate terminal of power switch 112 is connected to a driver output (DRV) of control logic 114. The driver output (DRV) of control logic 114 is activated (set to provide a logic high "1" signal) in response to the assertion of an enable input (EN). The enable input (EN) may be provided in response to the activation by a user of an electrical switch or push button, by a circuit configured to assert the enable input (EN), or the like. The assertion of an enable input in an information handling system and the resultant switching of an input voltage to the information handling system are known in the art and will not be further described herein, except as may be needed to illustrate the current embodiments.

Over-current detection circuit 116 operates to detect when a current provided by the input voltage (VIN) exceeds a particular threshold (i.e., an over-current condition), and, in response to detecting the over-current condition, to provide an over-current indication (OC) to control logic 114 and an over-current flag output (FLAG_OC-bar). As illustrated, over-current detection circuit 116 includes a sense resistor placed in series between the input voltage (VIN) and the voltage rail (VOUT). A voltage induced across the sense resistor by the current through the sense resistor is measured by a buffer and provided to a positive input of a comparator. When the induced voltage exceeds a reference voltage (I-Ref) provided on a negative input of the comparator, the comparator asserts the over-current indication (OC). In a particular embodiment, when control logic 114 receives the over-current indication (OC), the control logic operates to deassert the driver output (DRV) to turn power switch 112 off.

As further illustrated, the over-current indication (OC) is used to generate the over-current flag output (FLAG_OC-bar). In particular, the over-current flag output (FLAG_OC-bar) is an "active-low" signal. The over-current flag output (FLAG_OC-bar) is normally held in a logic high "1" state by a pull-up resistor. The over-current flag output (FLAG_OC-bar) is connected to ground by a N-MOS FET that is gated by the over-current indication (OC). Thus, when no over-current condition is detected and the over-current indication (OC) is in the logic low "0" state, the N-MOS FET is off and the over-current flag output (FLAG_OC-bar) remains in the logic high "1" state. Then, when an over-current condition is detected and the over-current indication (OC) is in the logic high "1" state, the N-MOS FET is turned on and the over-current flag output (FLAG_OC-bar) is pulled to the logic low "0" state.

As described above, power switch IC 110 represents a typical power switch for an information handling system that incorporates an over-current detection circuit, and provides an output signal that indicates when an over-current condition has been detected (e.g., the over-current flag output). In this regard, such a typical power switch only indicates the over-current condition. However, as described above, the ability to differentiate between over-current conditions and under-voltage conditions may be useful in determining whether a power fault is the result of a bad power switch, necessitating the replacement of a motherboard, or is the result of a shorted display device, necessitating the replacement of the display device, and may be advantageous in the servicing of information handling systems. As described further below, circuit 100 utilizes power switch IC 110 in combination with under-voltage detection circuit 120 and panel over-current indication circuit 130 to distinguish between these failure modes.

Under-voltage detection circuit 120 includes a comparator 122, a pull-up resistor 124, an N-MOS FET 126, and a pull-up resistor 128. A negative input of comparator 122 is connected to the voltage rail (VOUT), and a positive input of the comparator is connected to a voltage reference (V-Ref). The voltage reference (V-Ref) provides a low voltage reference threshold, such that, when the voltage rail (VOUT) is above the voltage reference (V-Ref), an output of comparator 122 is pulled to a logic low "0" state through the comparator, indicating the absence of an under-voltage condition. When the voltage rail (VOUT) is below the voltage reference (V-Ref), the output of comparator 122 is a logic high "1" state, indicating an under-voltage condition.

The output of comparator 122 is connected to a gate contact of N-MOS FET 126, a drain contact of the N-MOS FET is connected to pull-up resistor 128 and is used to provide an under-voltage fault indication (Fault_UV-bar), an active-low signal, and a source contact is connected to a ground plane. When no under-voltage condition is detected and the output of comparator 122 is in the logic low "0" state, N-MOS FET 126 is turned off and the under-voltage fault indication (Fault_UV-bar) is pulled to the logic high "1" state through pull-up resistor 128. Then, when an under-voltage condition is detected, and the output of comparator 122 changes to the logic high "1" state, N-MOS FET 126 is turned on, pulling the under-voltage fault indication (Fault_UV-bar) to the logic low "0" state providing the indication of the under-voltage fault.

The output of comparator 122 is further connected to the over-current flag output (FLAG_OC-bar) from power switch IC 110 through a diode 140. When no over-current condition is detected by over-current detection circuit 116, the over-current flag output (FLAG_OC-bar) is pulled to the logic high "1" state as described above, thereby enabling under-voltage detection circuit 120. However, when an over-current condition is detected by over-current detection circuit 116, the over-current flag output (FLAG_OC-bar) is pulled to the logic low "0" state through the over-current detection circuit, thereby pulling the output of comparator 122 to the logic low "0" state through diode 140 and disabling under-voltage detection circuit 120. Diode 140 within circuit 100 is used to eliminate potential state contention situations between the power over-current detection circuit 116 and the under-voltage detection circuit 120. The presence of under-voltage detection circuit 120 within circuit 100 operates to completely alter the meaning of a logic low "0" signal output from the circuit, as compared with the typical output from a power switch IC, such as switch IC 110. In particular, a logic low "0" signal on the over-current flag output (FLAG_OC-bar) indicates an over-current condition on circuit 100, while a logic low "0" signal on the under-voltage fault indication (Fault_UV-bar) indicates an under-voltage condition on the circuit. Note that diode 140, as illustrated, is represented as a Schottky diode, but this is not necessarily so, and other types of diodes may be utilized as needed or desired.

Panel over-current indication circuit 130 includes a square wave generator 132 and a P-MOS FET 134. Square wave generator 132 operates to provide a square wave signal on an output. As illustrated, square wave generator 132 includes an inverter, a resistor connected between an input and an output of the inverter, and a capacitor connected between the input and a ground plane. A logic high "1" state on the output operates to charge the capacitor through the resistor until the input rises to the logic high "1" state, resulting in a flip of the output to the logic low "0" state. The logic low "0" state on the output operates to permit the charge on the capacitor to discharge until the input drops to the logic low "0" state. The interplay between logic states on the output results in a square wave output. Square wave generator 132 may be understood to include other types of oscillating outputs, such as sine wave generators, triangle wave generators, or other oscillating outputs, as needed or desired, and the circuit topology of the square wave generator may differ from the illustrated topology as needed or desired.

The output of square wave generator 132 is connected to a source of P-MOS FET 134, the drain of P-MOS FET 134 provides an over-current fault indication (Fault_OC), and a gate of the P-MOS FET is connected to over-current flag output (FLAG_OC-bar). Here, when no over-current condition is detected by over-current detection circuit 116, the over-current flag output (FLAG_OC-bar) is pulled to the logic high "1" state as described above. The logic high "1" state on the over-current flag output (FLAG_OC-bar) operates to turn P-MOS FET 134 off, isolating the output from square wave generator 132 from the over-current fault indication (Fault_OC). On the other hand, when the over-current condition is detected by over-current detection circuit 116, the over-current flag output (FLAG_OC-bar) is pulled to the logic low "0" state as described above. The logic low "0" state on the over-current flag output (FLAG_OC-bar) operates to turn P-MOS FET 134 on, permitting the output from square wave generator 132 to be exhibited on the over-current fault indication (Fault_OC).

The over-current fault indication (Fault_OC) is connected in a wired-OR configuration to the under-voltage fault indication (Fault_UV-bar). The combination of the under-voltage fault indication (Fault_UV-bar) and the over-current fault indication (Fault_OC) provides a combined motherboard under-voltage and display panel over-current indication (MB_UV-bar/LCD_OC). When neither the over-current condition nor the under-voltage condition are detected, the motherboard under-voltage and display panel over-current indication (MB_UV-bar/LCD_OC) remains in the logic high "1" state. Then, when no over-current condition is detected but an under-voltage condition is detected, under-voltage detection circuit 120 is enabled and over-current indication circuit 130 is disabled as described above, and the motherboard under-voltage and display panel over-current indication (MB_UV-bar/LCD_OC) is pulled to the static logic low "0" state by the under-voltage detection circuit. Finally, when an over-current condition is detected, under-voltage detection circuit 120 is disabled and over-current indication circuit 130 is enabled as described above, and the motherboard under-voltage and display panel over-current indication (MB_UV-bar/LCD_OC) exhibits the square wave signal from square wave generator 132. A summary of the fault signal states is provided in Table 1, below.

board under-voltage and display panel over-current indication (MB_UV-bar/LCD_OC) exhibits the logic high "1" state indicating that no faults were detected by circuit 100.

However, if the motherboard under-voltage and display panel over-current indication (MB_UV-bar/LCD_OC) exhibits the logic low "0" state, BMC 150 receives the interrupt associated with the GPIO, and the BMC operates to increment counter 152, and to reset the interrupt. Then, each time the BMC receives another interrupt, the BMC operates to increment counter 152 and to reset the interrupt. When the predetermined time limit elapses, BMC 150 operates to determine the value of counter 152. If the value of counter 152 is equal to zero, then BMC 150 determines that no faults were detected by circuit 100. If the value of counter 152 is equal to one (1), then the motherboard under-voltage and display panel over-current indication (MB_UV-bar/LCD_OC) transitioned from the logic high "1" state to the logic low "0" state exactly one time, and BMC 150 determines that a motherboard under-voltage condition was detected by circuit 100, and the BMC provides an error code associated with a motherboard under-voltage condition to an error handler of the information handling system, as needed or desired. The under-voltage error code may be provided to recommend a service technician to replace the motherboard of the information handling system as needed or desired. If the value of counter 152 is greater than one (1), then the motherboard under-voltage and display panel over-current indication (MB_UV-bar/LCD_OC) transitioned from the logic high "1" state to the logic low "0" state multiple times, and BMC 150 determines that a LCD over-current condition was detected by circuit 100, and the BMC provides an error code associated with a LCD over-current condition to the error handler, as needed or desired. The over-current error code may be provided to recommend a service technician to replace the LCD of the information handling system as needed or desired.

Figure 2:
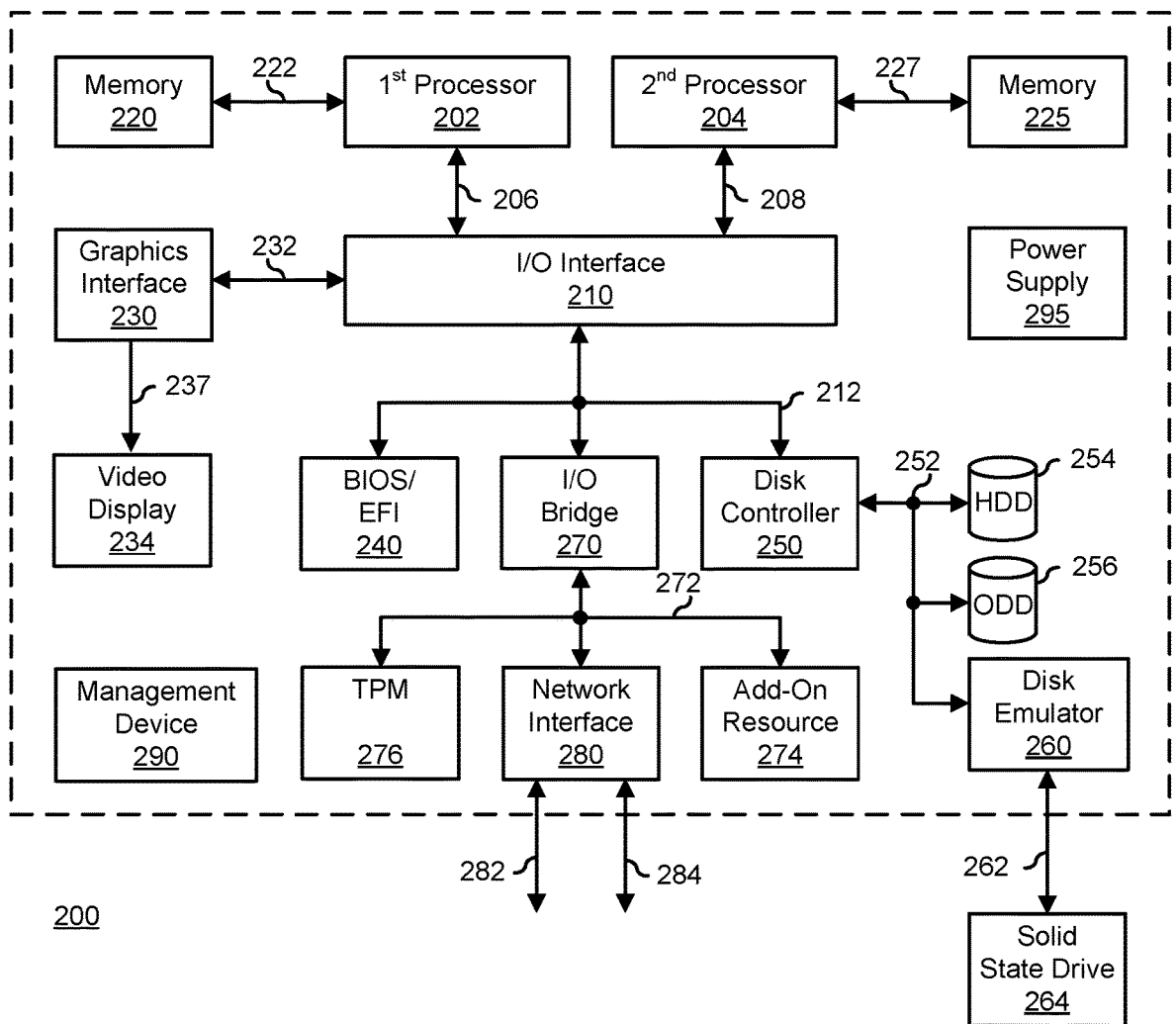
FIG. 2 is a block diagram illustrating a generalized information handling system according to another embodiment of the present disclosure.

FIG. 2 illustrates a generalized embodiment of an information handling system 200. For purpose of this disclosure an information handling system can include any instrumen-

TABLE 1

Fault Signal States

| FLAG_OC-bar | Fault_OC | Fault_UV-bar | MB_UV/ LCD_OC | Failure Mode | Service Action |
|---|---|---|---|---|---|
| H | Gated | H | Static H | Normal Ops | N/A |
| H | Gated | L | Static L | MB UV | Replace MB |
| L | Toggling | H (Disabled) | Toggling | LCD Short | Replace LCD |

The motherboard under-voltage and display panel over-current indication (MB_UV-bar/LCD_OC) is provided to an input of BMC 150. Here, it will be understood that BMC 150 may represent a BMC device and additional associated elements, such as a non-volatile memory device, a complex programmable logic device (CPLD), or the like. As such, the motherboard under-voltage and display panel over-current indication (MB_UV-bar/LCD_OC) may be provided to a programmable general purpose I/O (GPIO) pin associated with BMC 150. Here, when BMC 150 detects a power on event, such when a user initiates a power on, or the like, the BMC operates to enable an interrupt associated with the particular GPIO to detect any faults from circuit 100, and to reset a counter 152. In particular, the interrupt can be set to monitor the GPIO for a predetermined time limit, such as 500 milliseconds (ms). In normal operation, the mothertality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 264, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256, disk emulator 260, SSD 264, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 225 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 1394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power switch, comprising:
    an over-current detection circuit configured to detect an over-current condition in the power switch, to provide an over-current flag in a first state when no over-current condition is detected, and to provide the over-current flag in a second state when the over-current condition is detected;
    an under-voltage detection circuit configured to detect an under-voltage condition in the power switch, and to provide an under-voltage fault indication in a third state when the under-voltage condition is not detected, and to provide the under-voltage fault indication in a fourth state when the under-voltage condition is detected; and
    an over-current indication circuit configured to provide an over-current fault indication in the third state when the over-current flag is in the first state, and to provide the over-current fault indication in a fifth state when the over-current flag is in the second state;
    wherein the under-voltage fault indication and the over-current fault indication are configured in a wired-or to provide a common fault indication.

2. The power switch of claim 1, wherein the third state is a logic high "1" state, the fourth state is a logic low "0" state, and the fifth state is an oscillating state.

3. The power switch of claim 1, wherein the first state is a logic high "1" state and the second state is a logic low "0" state.

4. The power switch of claim 1, wherein when the over-current flag is in the first state, the over-current flag operates to enable the under-voltage detection circuit.

5. The power switch of claim 4, wherein when the over-current flag is in the second state, the over-current flag operates to disable the under-voltage detection circuit.

6. The power switch of claim 1, wherein when the over-current flag is in the first state, the over-current flag operates to disable the over-current indication circuit.

7. The power switch of claim 6, wherein when the over-current flag is in the second state, the over-current flag operates to enable the over-current indication circuit.

8. The power switch of claim 1, wherein the over-current indication circuit includes an oscillator circuit.

9. The power switch of claim 8, wherein, when the over-current flag is in the first state, the oscillator circuit is isolated from the over-current fault indication.

10. The power switch of claim 8, wherein, when the over-current flag is in the second state, the oscillator circuit is coupled to the over-current fault indication.

11. A method comprising:
    detecting, by an over-current detection circuit of an information handling system, an over-current condition in the power switch to provide an over-current flag in a first state when no over-current condition is detected and to provide the over-current flag in a second state when the over-current condition is detected;
    detecting, by an under-voltage detection circuit of the information handling system, an under-voltage condition in the power switch to provide an under-voltage fault indication in a third state when the under-voltage condition is not detected and to provide the under-voltage fault indication in a fourth state when the under-voltage condition is detected; and
    providing, by the over-current indication circuit, an over-current fault indication in the third state when the over-current flag is in the first state and in a fifth state when the over-current flag is in the second state;
    wherein the under-voltage fault indication and the over-current fault indication are configured in a wired-or to provide a common fault indication.

12. The method of claim 11, wherein the third state is a logic high "1" state, the fourth state is a logic low "0" state, and the fifth state is an oscillating state.

13. The method of claim 11, wherein the first state is a logic high "1" state and the second state is a logic low "0" state.

14. The method of claim 11, wherein, when the over-current flag is in the first state, the method further comprises enabling, by the over-current flag, the under-voltage detection circuit.

15. The method of claim 14, wherein, when the over-current flag is in the second state, the method further comprises disabling, by the over-current flag, the under-voltage detection circuit.

16. The method of claim 11, wherein, when the over-current flag is in the first state, the method further comprises disabling, by the over-current flag, the over-current indication circuit.

17. The method of claim 16, wherein, when the over-current flag is in the second state, the method further comprises enabling, by the over-current flag, the over-current indication circuit.

18. The method of claim 11, wherein the over-current indication circuit includes an oscillator circuit.

19. The method of claim 18, wherein:
when the over-current flag is in the first state, the method further comprises isolating the oscillator circuit from the over-current fault indication; and
when the over-current flag is in the second state, the method further comprises coupling the oscillator circuit to the over-current fault indication.

20. An information handling system, comprising:
a baseboard management controller; and
a power switch including:
an over-current detection circuit configured to detect an over-current condition in the power switch, to provide an over-current flag in a first state when no over-current condition is detected, and to provide the over-current flag in a second state when the over-current condition is detected;
an under-voltage detection circuit configured to detect an under-voltage condition in the power switch, and to provide an under-voltage fault indication in a third state when on under-voltage condition is not detected, and to provide the under-voltage fault indication in a fourth state when the under-voltage condition is detected; and
an over-current indication circuit configured to provide an over-current fault indication in the third state when the over-current flag is in the first state, and to provide the over-current fault indication in a fifth state when the over-current flag is in the second state;
wherein the under-voltage fault indication and the over-current fault indication are configured in a wired-or to provide a common fault indication coupled to the baseboard management controller.

* * * * *